US012620650B2

(12) United States Patent
Horiguchi et al.

(10) Patent No.: US 12,620,650 B2
(45) Date of Patent: May 5, 2026

(54) POWER STORAGE DEVICE

(71) Applicant: TOYOTA JIDOSHA KABUSHIKI KAISHA, Toyota (JP)

(72) Inventors: Kotaro Horiguchi, Nagoya (JP); Ryota Aoki, Okazaki (JP); Shinichiro Mori, Okazaki (JP); Kazunari Hiromori, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 801 days.

(21) Appl. No.: 17/949,392

(22) Filed: Sep. 21, 2022

(65) Prior Publication Data

US 2023/0101177 A1 Mar. 30, 2023

(30) Foreign Application Priority Data

Sep. 24, 2021 (JP) ................................. 2021-155478

(51) Int. Cl.
| | |
|---|---|
| *H01M 10/6554* | (2014.01) |
| *H01M 10/04* | (2006.01) |
| *H01M 10/613* | (2014.01) |
| *H01M 10/625* | (2014.01) |
| *H01M 50/204* | (2021.01) |

(52) U.S. Cl.
CPC ... *H01M 10/6554* (2015.04); *H01M 10/0481* (2013.01); *H01M 10/613* (2015.04); *H01M 10/625* (2015.04); *H01M 50/204* (2021.01); *H01M 2220/20* (2013.01)

(58) Field of Classification Search
CPC ........... H01M 10/6554; H01M 10/613; H01M 10/625; H01M 50/204; H01M 2220/20
See application file for complete search history.

(56) References Cited

U.S. PATENT DOCUMENTS

| | | | | |
|---|---|---|---|---|
| 2018/0287227 A1* | 10/2018 | Jeong | ...................... | B60L 58/25 |
| 2018/0301773 A1 | 10/2018 | Sugiyama et al. | | |
| 2019/0221904 A1 | 7/2019 | Fujii | | |
| 2021/0184289 A1* | 6/2021 | Jeong | .................. | H01M 50/557 |
| 2022/0407147 A1* | 12/2022 | Suzumori | ............... | B60L 50/64 |
| 2024/0120573 A1* | 4/2024 | Sasaki | ............... | H01M 10/6555 |

FOREIGN PATENT DOCUMENTS

| | | |
|---|---|---|
| JP | 2019-125449 A | 7/2019 |
| JP | 2020-053148 A | 4/2020 |
| WO | 2017/122438 A1 | 7/2017 |

* cited by examiner

*Primary Examiner* — Allison Bourke
*Assistant Examiner* — Verita E Grannum
(74) *Attorney, Agent, or Firm* — Dinsmore & Shohl LLP

(57) ABSTRACT

A power storage device includes: a power storage stack including a first cell group, a second cell group, and a middle plate; a lower case having a bottom wall portion; a first heat conduction member disposed between the first cell group and the bottom wall portion; and a second heat conduction member disposed between the second cell group and the bottom wall portion. The lower case includes a pedestal portion supporting the middle plate, and the first heat conduction member and the second heat conduction member are provided to contact the pedestal portion.

15 Claims, 5 Drawing Sheets

UP-DOWN
DIRECTION

DR1

DR2

POWER STORAGE DEVICE

CROSS REFERENCE TO RELATED APPLICATIONS

This nonprovisional application claims priority to Japanese Patent Application No. 2021-155478 filed on Sep. 24, 2021 with the Japan Patent Office, the entire contents of which are hereby incorporated by reference.

BACKGROUND

Field

The present disclosure relates to a power storage device mounted on a vehicle.

Description of the Background Art

As a conventional power storage device, Japanese Patent Laying-Open No. 2020-053148 discloses a power storage device which includes a power storage stack and a cooler having a plurality of main cooling surfaces and recesses each provided between the plurality of main cooling surfaces, and in which a gel heat conduction member is disposed between the power storage stack and the plurality of main cooling surfaces, in a configuration in which the power storage stack and the cooler are disposed within a housing case.

SUMMARY

However, in the power storage device described in Japanese Patent Laying-Open No. 2020-053148, since the recesses are each provided between the plurality of main cooling surfaces, it is difficult to ensure that the heat conduction member has a large area, and heat conductivity may be reduced.

Furthermore, a configuration in which a cooler is disposed outside a housing case has been considered. In such a case, it is conceivable to bring a bottom surface of a power storage stack into thermally close contact with a bottom wall portion of a lower case using a heat conduction member. In adhering the bottom surface of the power storage stack to the bottom wall portion via the heat conduction member, air between the bottom surface of the power storage stack and the bottom wall portion may fail to escape therefrom and remain therein. In such a case, adhesiveness of the power storage stack with respect to the lower case is reduced. Furthermore, when the heat conduction member has a small area, heat conductivity is reduced.

The present disclosure has been made in view of the aforementioned problem, and an object of the present disclosure is to provide a power storage device that can improve adhesiveness of a power storage stack with respect to a lower case via a heat conduction member, and can ensure good heat conductivity.

A power storage device based on the present disclosure includes: a power storage stack that includes a first cell group and a second cell group each including a plurality of power storage cells, and a middle plate disposed between the first cell group and the second cell group; a lower case that has a bottom wall portion and on which the power storage stack is disposed; a first heat conduction member disposed between the first cell group and the bottom wall portion; and a second heat conduction member disposed between the second cell group and the bottom wall portion. The lower case includes a pedestal portion that is provided to rise from the bottom wall portion and supports the middle plate. The first heat conduction member and the second heat conduction member are provided to contact the pedestal portion.

By pressing and enlarging the first heat conduction member and the second heat conduction member by the power storage stack and the bottom wall portion of the lower case such that the middle plate is supported by the pedestal portion and the first heat conduction member and the second heat conduction member contact the pedestal portion as in the configuration described above, the first heat conduction member and the second heat conduction member can be pressed to be enlarged while letting air escape from the periphery of the pedestal portion surrounded by the first heat conduction member and the second heat conduction member, a bottom surface of the power storage stack, and the bottom wall portion. Thereby, the first heat conduction member and the second heat conduction member can have large areas. As a result, it is possible to maintain good heat conductivity, while improving adhesiveness between the power storage stack (the first cell group and the second cell group) and the bottom wall portion of the lower case via the first heat conduction member and the second heat conduction member.

In the power storage device based on the present disclosure, the middle plate may have a first protruding portion protruding from the pedestal portion toward the first cell group, and a second protruding portion protruding from the pedestal portion toward the second cell group, in an arrangement direction in which the first cell group and the second cell group are arranged. In this case, when seen from a direction perpendicular to the arrangement direction, the first heat conduction member may be provided to fill a gap between the first protruding portion and the pedestal portion, and the second heat conduction member may be provided to fill a gap between the second protruding portion and the pedestal portion.

According to the configuration described above, the first heat conduction member and the second heat conduction member can reliably be brought into contact with end portions of the first cell group and the second cell group located on the middle plate side.

In the power storage device based on the present disclosure, the pedestal portion may include a first pedestal portion and a second pedestal portion disposed to be spaced from each other in a direction perpendicular to an arrangement direction in which the first cell group and the second cell group are arranged.

According to the configuration described above, when the first heat conduction member and the second heat conduction member are pressed to be enlarged, air can escape from the peripheries of both of the first pedestal portion and the second pedestal portion. Thereby, the adhesiveness of the power storage stack with respect to the lower case can be further improved.

The power storage device based on the present disclosure may further include a cooler for cooling the power storage stack. The bottom wall portion may have an inner main surface facing toward the power storage stack, and an outer main surface located opposite to a side on which the power storage stack is located. In some embodiments, the cooler is disposed outside the lower case to thermally contact the outer main surface.

By having the configuration described above, in the configuration in which the cooler is disposed outside the lower case, the power storage stack can be cooled via the bottom wall portion of the lower case and the first heat conduction member and the second heat conduction member.

The power storage device based on the present disclosure may further include a pressing member that presses the power storage stack toward the bottom wall portion. The power storage stack has one end and another end in the arrangement direction. In some embodiments, the pressing member has a first pressing portion for pressing the one end toward the bottom wall portion, and a second pressing portion for pressing the other end toward the bottom wall portion.

By having the configuration described above, the power storage stack can be pressed toward the bottom wall portion, and thereby the adhesiveness between the power storage stack and the bottom wall portion of the lower case can be further improved.

The foregoing and other objects, features, aspects and advantages of the present disclosure will become more apparent from the following detailed description of the present disclosure when taken in conjunction with the accompanying drawings.

DETAILED DESCRIPTION

Figure 1:
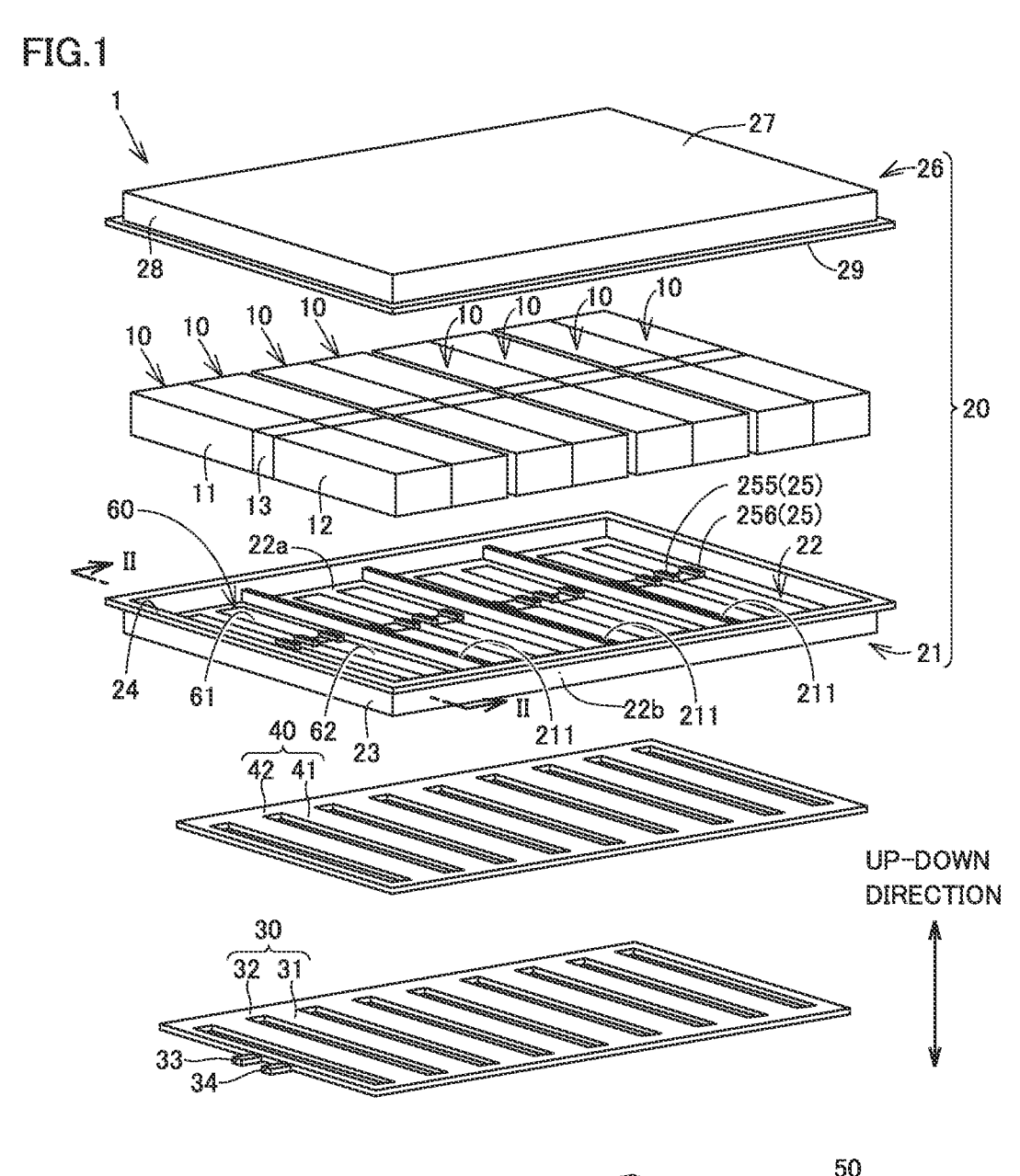
FIG. 1 is an exploded perspective view of a power storage device in accordance with an embodiment.

Hereinafter, an embodiment of the present disclosure will be described in detail with reference to the drawings. It should be noted that, in the embodiment described below, identical or common parts will be designated by the same reference numerals in the drawings, and the description thereof will not be repeated.

Figure 2:
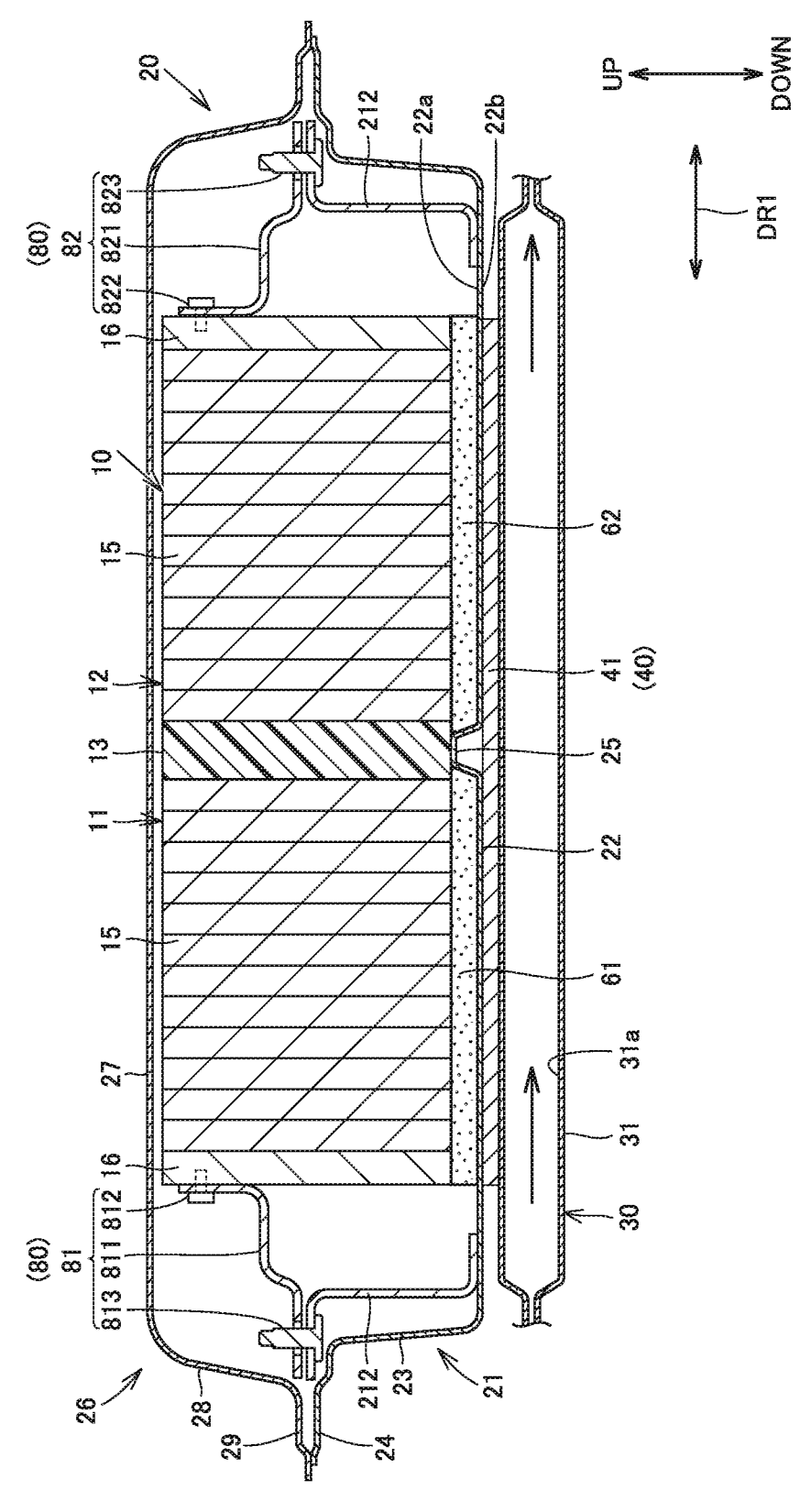
FIG. 2 is a cross sectional view of the power storage device in accordance with the embodiment.

FIG. 1 is an exploded perspective view of a power storage device in accordance with an embodiment. FIG. 2 is a cross sectional view of the power storage device in accordance with the embodiment, and is a cross sectional view taken along a line II-II shown in FIG. 1. It should be noted that a share panel 50 described later is omitted in FIG. 2 for the sake of convenience. Referring to FIGS. 1 and 2, a power storage device 1 in accordance with the embodiment will be described.

Power storage device 1 in accordance with the embodiment is mounted on a hybrid vehicle that can run using motive power of at least one of a motor and an engine, or an electrically powered vehicle that runs using a driving force obtained by electrical energy.

As shown in FIGS. 1 and 2, power storage device 1 in accordance with the embodiment includes a plurality of power storage stacks 10, a housing case 20, a cooler 30, an outer heat conduction layer 40, share panel 50, heat conduction members 60, and a pressing member 80 (see FIG. 2).

Each of the plurality of power storage stacks 10 includes a first cell group 11, a second cell group 12, a middle plate 13, and a pair of end plates 16 (see FIG. 2).

First cell group 11 and second cell group 12 each include a plurality of power storage cells 15 (see FIG. 2) disposed side by side in a predetermined direction (a DR1 direction). In a state where power storage device 1 is mounted on the vehicle, DR1 direction is a direction parallel to a width direction of the vehicle, for example.

Each power storage cell 15 is, for example, a secondary battery such as a nickel-hydrogen battery or a lithium ion battery. A single battery has a rectangular shape, for example. The secondary battery may be a secondary battery using a liquid electrolyte, or a secondary battery using a solid electrolyte. Further, power storage cell 15 may be a unit capacitor configured to store power.

Middle plate 13 is disposed between first cell group 11 and second cell group 12. Middle plate 13 is disposed at the center of power storage stack 10 in DR1 direction. Middle plate 13 is made of a synthetic resin or the like having insulation properties, for example.

An arrangement direction in which first cell group 11 and second cell group 12 are arranged is parallel to the direction in which the plurality of power storage cells 15 are disposed side by side, and is parallel to DR1 direction.

The pair of end plates 16 are disposed at both ends of power storage stack 10 in DR1 direction to sandwich first cell group 11, middle plate 13, and second cell group 12 therebetween. The pair of end plates 16 are made of a metal material such as aluminum, for example.

The plurality of power storage stacks 10 are disposed side by side in a direction perpendicular to DR1 direction (i.e., in a DR2 direction). In the state where power storage device 1 is mounted on the vehicle, DR2 direction is a direction parallel to a front-rear direction of the vehicle, for example.

Housing case 20 houses the plurality of power storage stacks 10 therein. Housing case 20 includes a lower case 21 and an upper case 26.

Lower case 21 has a substantially box shape opened upward. Lower case 21 has heat conductivity, and is formed of a metal, for example. Lower case 21 has a bottom wall portion 22, a peripheral wall portion 23, a flange portion 24, a pedestal portion 25, partition walls 211, and reinforcing brackets 212 (see FIG. 2).

Bottom wall portion 22 is located below the plurality of power storage stacks 10. Bottom wall portion 22 has an inner main surface 22a facing toward power storage stacks 10, and an outer main surface 22b facing opposite to a side on which power storage stacks 10 are located.

Peripheral wall portion 23 is provided to rise from a peripheral edge of bottom wall portion 22. Flange portion 24 is provided to overhang outward from an upper end of peripheral wall portion 23.

Partition walls 211 are provided in plural numbers. Partition walls 211 are disposed side by side in DR2 direction at a predetermined spacing. Partition walls 211 partition a region in which power storage stacks 10 are disposed, at the predetermined spacing. Although each partition wall 211 partitions a region in which two power storage stacks 10 are disposed in the present embodiment, the present disclosure is not limited thereto, and positions of partition walls 211 can be set as appropriate. Both ends of each partition wall 211 in DR1 direction are connected to peripheral wall portion 23. Partition walls 211 reinforce peripheral wall portion 23.

Pedestal portion 25 is provided to rise upward from a central portion of bottom wall portion 22 in DR1 direction. A plurality of pedestal portions 25 are provided corresponding to power storage stacks 10. Pedestal portion 25 is provided in each of the regions partitioned by the plurality of partition walls 211 described above. A top portion 251 (see FIG. 3) of pedestal portion 25 is formed flatly. Middle plate 13 is mounted on top portion 251 of pedestal portion 25. Pedestal portion 25 supports middle plate 13.

Pedestal portion 25 includes a first pedestal portion 255 and a second pedestal portion 256. First pedestal portion 255 and second pedestal portion 256 are disposed to be spaced from each other in DR2 direction. First pedestal portion 255 supports one end side of middle plate 13 in DR2 direction. Second pedestal portion 256 supports the other end side of middle plate 13 in DR2 direction.

Reinforcing brackets 212 are disposed between peripheral wall portion 23 and power storage stack 10, on both sides of power storage stack 10 in DR1 direction. Reinforcing brackets 212 reinforce attachment of power storage stack 10 to bottom wall portion 22.

Each reinforcing bracket 212 has an upper end portion, a lower end portion, and a connecting portion that connects the upper end portion and the lower end portion. The upper end portion and the lower end portion each have a flat plate shape extending away from power storage stack 10 along DR1 direction, and the connecting portion is provided to extend along an up-down direction.

The lower end portion of reinforcing bracket 212 is connected to inner main surface 22a of bottom wall portion 22 by welding or the like, for example. The upper end portion of reinforcing bracket 212 is connected to flange portion 24 by welding or the like, for example.

Upper case 26 has a substantially box shape opened downward. Upper case 26 is made of a metal, for example.

Upper case 26 has a ceiling portion 27, a peripheral wall portion 28, and a flange portion 29. Ceiling portion 27 forms an upper wall of housing case 20. Peripheral wall portion 28 is provided to extend downward from a peripheral edge of ceiling portion 27. Flange portion 29 is provided to overhang outward from a lower end of peripheral wall portion 28.

Flange portion 24 and flange portion 29, in a state where they overlap each other in the up-down direction, are fastened by a plurality of fastening members (not shown). Thereby, upper case 26 and lower case 21 house the plurality of power storage stacks 10 therein.

Cooler 30 is a device for cooling the plurality of power storage stacks 10. Cooler 30 is disposed outside housing case 20. Specifically, cooler 30 is disposed below bottom wall portion 22 of lower case 21. Outer heat conduction layer 40 is disposed between cooler 30 and outer main surface 22b. Cooler 30 is disposed outside lower case 21 to thermally contact outer main surface 22b.

Cooler 30 is made of a metal material such as aluminum. Cooler 30 includes a plurality of main cooling portions 31 and a holding portion 32. A refrigerant flow path 31a (see FIG. 2) through which a refrigerant for cooling power storage stacks 10 flows is provided inside the plurality of main cooling portions 31 and holding portion 32. In each main cooling portion 31, the refrigerant flows from the first cell group 11 side toward the second cell group 12 side, as indicated by arrows in FIG. 2.

Cooler 30 has a refrigerant introducing portion 33 and a refrigerant discharging portion 34. The refrigerant is introduced from outside into the refrigerant flow path via refrigerant introducing portion 33. The refrigerant is discharged from the refrigerant flow path via refrigerant discharging portion 34.

The plurality of main cooling portions 31 are disposed side by side in a direction parallel to DR2 direction. The plurality of main cooling portions 31 extend along DR1 direction. Each of the plurality of main cooling portions 31 is disposed at a position facing power storage stack 10, with bottom wall portion 22 being sandwiched therebetween.

Holding portion 32 holds the plurality of main cooling portions 31. Holding portion 32 is provided to hold at least both ends of each main cooling portion 31 in DR1 direction. Holding portion 32 is provided, for example, to include a pair of extending portions extending along DR2 direction at the both ends of each main cooling portion 31. Holding portion 32 may be provided in a frame shape to surround the plurality of main cooling portions 31.

Outer heat conduction layer 40 is made of a heat conduction material, and is disposed between bottom wall portion 22 of lower case 21 and cooler 30. Outer heat conduction layer 40 has a plurality of central heat conduction portions 41 and an annular heat conduction portion 42.

The plurality of central heat conduction portions 41 are disposed between main cooling portions 31 and bottom wall portion 22 of lower case 21. Each central heat conduction portion 41 has a shape extending in DR1 direction.

Annular heat conduction portion 42 has a shape surrounding central heat conduction portions 41. Annular heat conduction portion 42 is disposed between holding portion 32 and housing case 20. This suppresses water from entering a space inside annular heat conduction portion 42.

Outer heat conduction layer 40 also functions as an adhesion layer, and adheres and fixes cooler 30 to bottom wall portion 22. Outer heat conduction layer 40 is made of an adhesive containing a silicone-based resin, an acrylic-based resin, an urethane resin, an epoxy resin, or the like.

Share panel 50 is disposed to cover cooler 30 from a lower side. Share panel 50 protects cooler 30 and suppresses cooler 30 from being wetted by water. Share panel 50 is made of a metal material. Share panel 50 includes a cover panel.

Each heat conduction member 60 is disposed between each power storage stack 10 and bottom wall portion 22 (more specifically, inner main surface 22a). Heat conduction member 60 also functions as an adhesion layer, and adheres and fixes each power storage stack 10 to bottom wall portion 22.

Heat conduction member 60 has a first heat conduction member 61 and a second heat conduction member 62. First heat conduction member 61 is disposed between first cell group 11 and bottom wall portion 22. First heat conduction member 61 adheres and fixes first cell group 11 to bottom wall portion 22. Second heat conduction member 62 is disposed between second cell group 12 and bottom wall portion 22. Second heat conduction member 62 adheres and fixes second cell group 12 to bottom wall portion 22.

First heat conduction member 61 and second heat conduction member 62 are made of a resin member having heat conductivity. As first heat conduction member 61 and second heat conduction member 62, for example, an adhesive containing a silicone-based resin, an acrylic-based resin, an urethane resin, an epoxy resin, or the like can be adopted. In a case where first heat conduction member 61 and second heat conduction member 62 are made of the same material, the members can be simplified, when compared with a case where they are made of materials different from each other.

It should be noted that the refrigerant flows from the first cell group 11 side toward the second cell group 12 side. That is, second cell group 12 is cooled via the refrigerant that has cooled first cell group 11. Accordingly, in order to suppress a temperature difference between first cell group 11 and second cell group 12, heat conductivity of second heat conduction member 62 may be higher than heat conductivity of first heat conduction member 61.

Pressing member 80 is a member that presses power storage stack 10 toward bottom wall portion 22. Pressing member 80 attaches power storage stack 10 to housing case 20 with power storage stack 10 being pressed toward bottom wall portion 22 such that first heat conduction member 61 and second heat conduction member 62 are pressed to be enlarged. Pressing member 80 has a first pressing portion 81 and a second pressing portion 82.

First pressing portion 81 presses one end of power storage stack 10 in DR1 direction toward bottom wall portion 22. First pressing portion 81 has a bracket 811, an inner fastening member 812, and an outer fastening member 813.

Bracket 811 is a member for attaching first cell group 11 to housing case 20. Bracket 811 is made of a metal. An inner end portion of bracket 811 in DR1 direction is fixed to the one end of power storage stack 10 by inner fastening member 812. An outer end portion of bracket 811 in DR1 direction is fixed to the upper end portion of reinforcing bracket 212 by outer fastening member 813.

Second pressing portion 82 presses the other end of power storage stack 10 in DR1 direction toward bottom wall portion 22. Second pressing portion 82 has a bracket 821, an inner fastening member 822, and an outer fastening member 823.

Bracket 821 is a member for attaching second cell group 12 to housing case 20. Bracket 821 is made of a metal. An inner end portion of bracket 821 in DR1 direction is fixed to the other end of power storage stack 10 by inner fastening member 822. An outer end portion of bracket 821 in DR1 direction is fixed to the upper end portion of reinforcing bracket 212 by outer fastening member 823.

As described above, first heat conduction member 61 disposed between first cell group 11 and bottom wall portion 22, and second heat conduction member 62 disposed between second cell group 12 and bottom wall portion 22 can be pressed to be enlarged by pressing first cell group 11 and second cell group 12 toward bottom wall portion 22 using first pressing portion 81 and second pressing portion 82.

Figure 3:
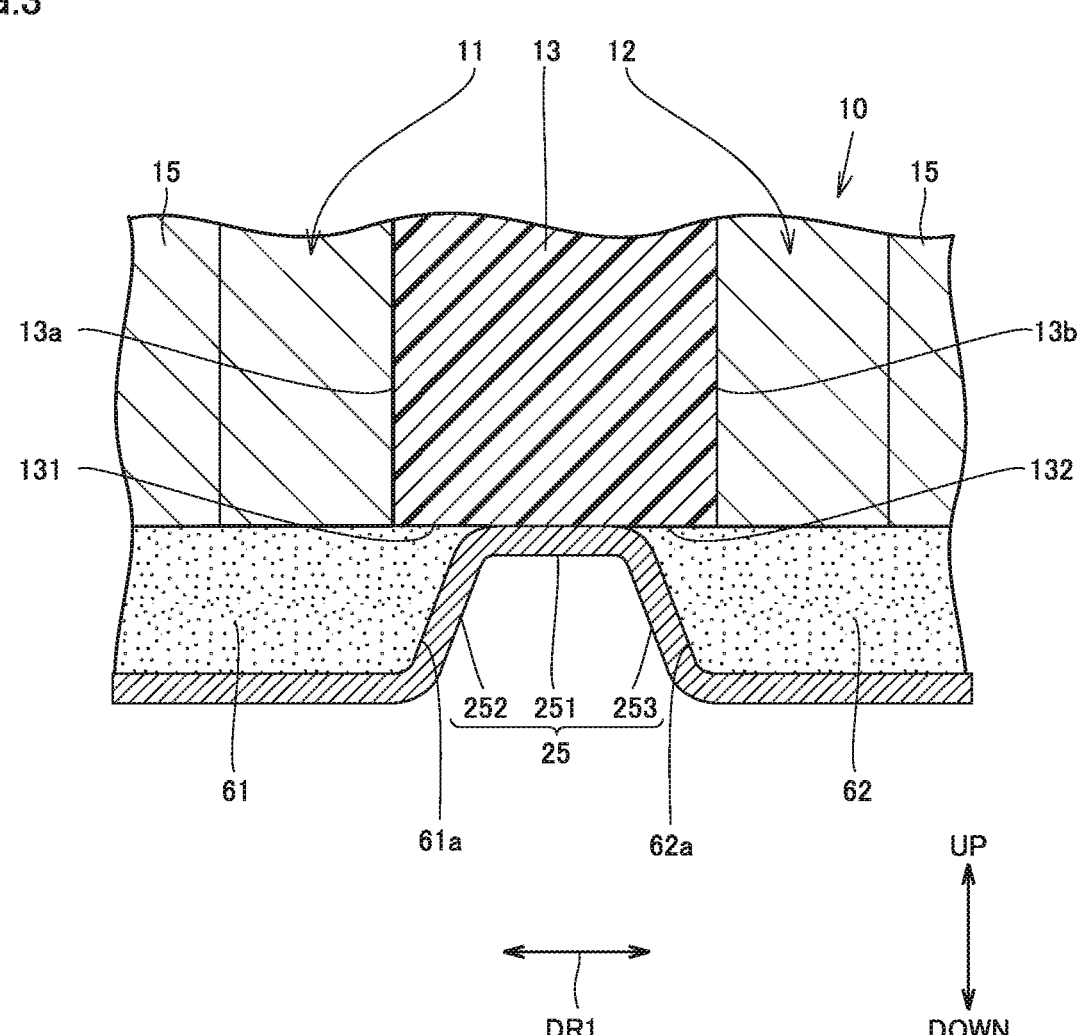
FIG. 3 is a partial cross sectional view showing an enlarged periphery of a lower end of a middle plate of the power storage device in accordance with the embodiment.

FIG. 3 is a partial cross sectional view showing an enlarged periphery of a lower end of the middle plate of the power storage device in accordance with the embodiment. It should be noted that outer heat conduction layer 40, cooler 30, and share panel 50 are omitted in FIG. 3 for the sake of convenience. Referring to FIG. 3, a configuration of the periphery of the lower end of middle plate 13 will be described.

As shown in FIG. 3, pedestal portion 25 includes top portion 251 and inclined portions 252 and 253. Top portion 251 has a substantially flat plate shape. Inclined portion 252 is connected to one end of top portion 251 in DR1 direction, and is inclined to extend downward as it approaches one side in DR1 direction (the one end side of power storage stack 10). Inclined portion 253 is connected to the other end of the top portion in DR1 direction, and is inclined to extend downward as it approaches the other side in DR1 direction (the other end side of power storage stack 10).

Middle plate 13 is mounted on pedestal portion 25 (more specifically, top portion 251). Middle plate 13 has a first end portion 13a located on the first cell group 11 side, and a second end portion 13b located on the second cell group 12 side, in DR1 direction.

Middle plate 13 has a first protruding portion 131 protruding from top portion 251 of pedestal portion 25 toward first cell group 11, and a second protruding portion 132 protruding from top portion 251 of pedestal portion 25 toward second cell group 12.

First heat conduction member 61 is provided to contact pedestal portion 25. An end portion 61a of first heat conduction member 61 located on the second heat conduction member 62 side contacts inclined portion 252. When seen from a direction perpendicular to the arrangement direction, first heat conduction member 61 is provided to fill a gap between first protruding portion 131 and pedestal portion 25.

Second heat conduction member 62 is provided to contact pedestal portion 25. An end portion 62a of second heat conduction member 62 located on the first heat conduction member 61 side contacts inclined portion 253. When seen from the direction perpendicular to the arrangement direction, second heat conduction member 62 is provided to fill a gap between second protruding portion 132 and pedestal portion 25.

Figure 4:
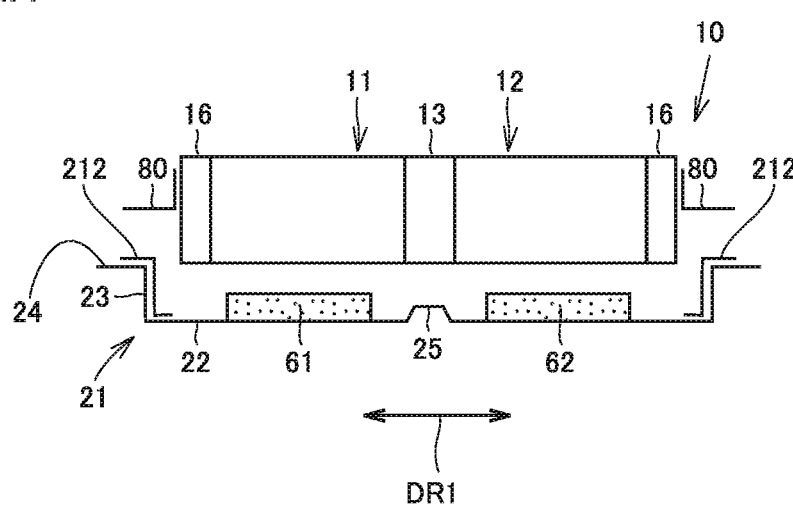
FIG. 4 is a schematic view showing an initial state of a step of attaching a power storage stack to a lower case via a first heat conduction member and a second heat conduction member, in a process of manufacturing the power storage device in accordance with the embodiment.

FIG. 4 is a schematic view showing an initial state of a step of attaching power storage stack 10 to lower case 21 via the first heat conduction member and the second heat conduction member, in a process of manufacturing the power storage device in accordance with the embodiment.

As shown in FIG. 4, in attaching power storage stack 10 to lower case 21 via first heat conduction member 61 and second heat conduction member 62, first, bottom wall portion 22 of lower case 21 and power storage stack 10 are disposed to face each other, with first heat conduction member 61 and second heat conduction member 62 being applied to bottom wall portion 22.

Figure 5:
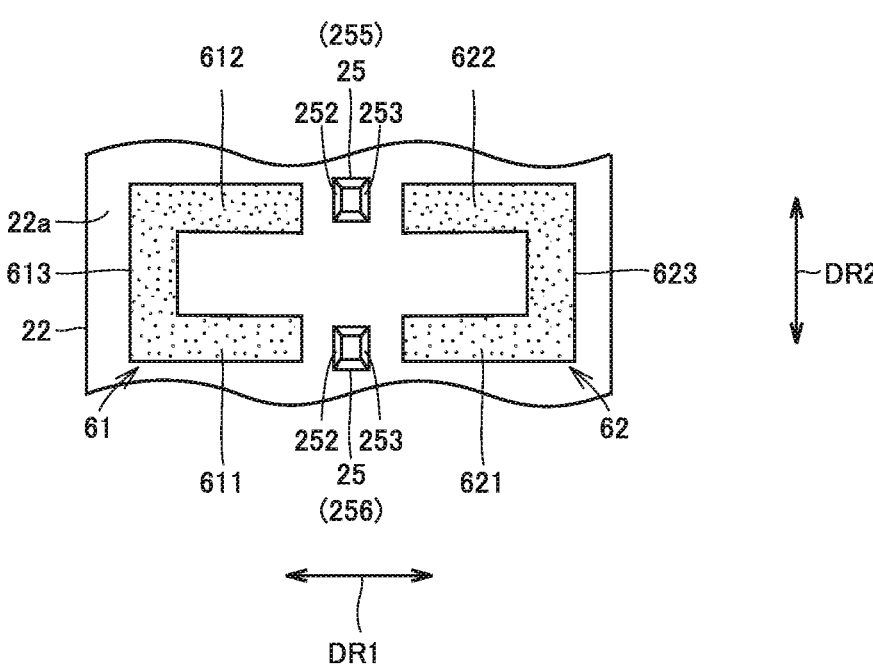
FIG. 5 is a view of the first heat conduction member and the second heat conduction member applied to a bottom wall portion, seen in a plan view.

FIG. 5 is a view of the first heat conduction member and the second heat conduction member applied to the bottom wall portion, seen in a plan view.

As shown in FIG. 5, first heat conduction member 61 and second heat conduction member 62 are applied on inner main surface 22a of bottom wall portion 22. First heat conduction member 61 and second heat conduction member 62 are each applied to have a substantially C shape opened toward pedestal portion 25. First heat conduction member 61 and second heat conduction member 62 may be applied continuously, or may be applied intermittently with a spacing. First heat conduction member 61 and second heat conduction member 62 are applied to have a gap between each member and pedestal portion 25.

First heat conduction member 61 is applied to have a first portion 611, a second portion 612, and a third portion 613. First portion 611 and second portion 612 are formed to be spaced from each other in DR2 direction, and extend along DR1 direction. Third portion 613 is provided on an end side of first portion 611 and second portion 612 located opposite to a side on which pedestal portion 25 is located, in DR1 direction. Third portion 613 is provided to extend in DR2 direction.

Similarly, second heat conduction member 62 is applied to have a first portion 621, a second portion 622, and a third portion 623. First portion 621 and second portion 622 are formed to be spaced from each other in DR2 direction, and extend along DR1 direction. Third portion 623 is provided on an end side of first portion 621 and second portion 622 located opposite to a side on which pedestal portion 25 is located, in DR1 direction. Third portion 623 is provided to extend in DR2 direction.

Figure 6:
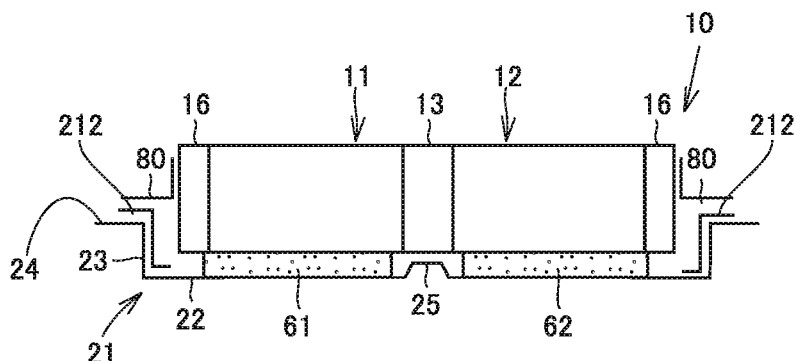
FIG. 6 is a schematic view showing an intermediate state of the step of attaching the power storage stack to the lower case via the first heat conduction member and the second heat conduction member, in the process of manufacturing the power storage device in accordance with the embodiment.

FIG. 6 is a schematic view showing an intermediate state of the step of attaching power storage stack 10 to lower case 21 via the first heat conduction member and the second heat conduction member, in the process of manufacturing the power storage device in accordance with the embodiment.

As shown in FIG. 6, in the intermediate state, power storage stack 10 is moved toward bottom wall portion 22 to reduce the spacing between a bottom surface of power storage stack 10 and bottom wall portion 22. On this occasion, first heat conduction member 61 and second heat conduction member 62 are sandwiched between first and second cell groups 11 and 12 and bottom wall portion 22, and are pressed to be enlarged.

Figure 7:
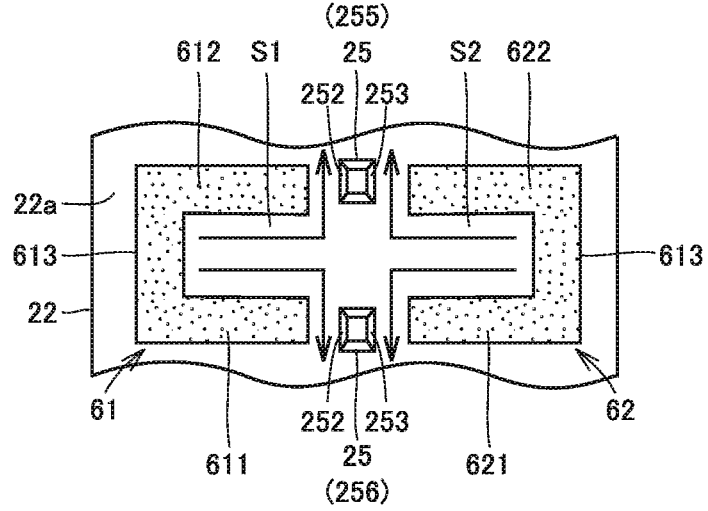
FIG. 7 is a view schematically showing movement of air between a bottom surface of the power storage stack and the bottom wall portion, in the intermediate state shown in FIG. 6.

FIG. 7 is a view schematically showing movement of air between the bottom surface of the power storage stack and the bottom wall portion, in the intermediate state shown in FIG. 6.

As shown in FIG. 7, when first heat conduction member 61 and second heat conduction member 62 are pressed to be enlarged, air within spaces S1 and S2 surrounded by first heat conduction member 61, second heat conduction member 62, the bottom surface of power storage stack 10, and bottom wall portion 22 can escape from the periphery of pedestal portion 25 to the outside of power storage stack 10, as indicated by arrows in the drawing. First heat conduction member 61 and second heat conduction member 62, which are pressed to be enlarged, fill gaps between first and second cell groups 11 and 12 and bottom wall portion 22.

Thus, adhesiveness between power storage stack 10 and bottom wall portion 22 of lower case 21 can be improved by pressing and enlarging first heat conduction member 61 and second heat conduction member 62 while letting the air escape. In addition, the adhesiveness can be further improved by letting the air escape from the peripheries of both of first pedestal portion 255 and second pedestal portion 256.

Figure 8:
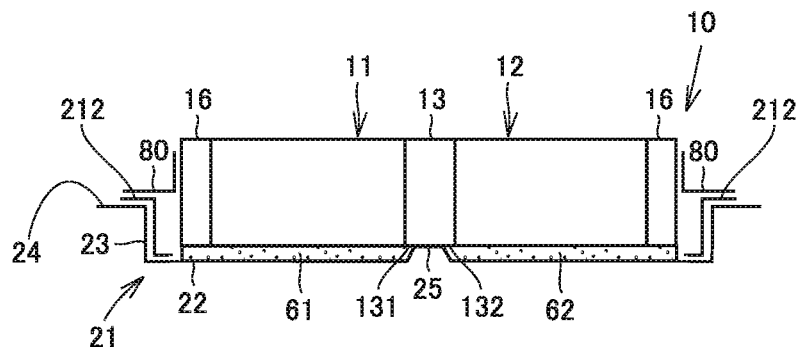
FIG. 8 is a schematic view showing a later state of the step of attaching the power storage stack to the lower case via the first heat conduction member and the second heat conduction member, in the process of manufacturing the power storage device in accordance with the embodiment.

FIG. 8 is a schematic view showing a later state of the step of attaching power storage stack 10 to lower case 21 via the first heat conduction member and the second heat conduction member, in the process of manufacturing the power storage device in accordance with the embodiment.

As shown in FIG. 8, in the later state, first heat conduction member 61 and second heat conduction member 62 contact pedestal portion 25 such that middle plate 13 is mounted on pedestal portion 25. Since the first heat conduction member and the second heat conduction member are pressed to be enlarged in this manner, first heat conduction member 61 and second heat conduction member 62 can have large areas. Thereby, it is possible to maintain good heat conductivity.

On this occasion, since first heat conduction member 61 fills the gap between first protruding portion 131 and pedestal portion 25 and second heat conduction member 62 fills the gap between second protruding portion 132 and pedestal portion 25 as described above, first heat conduction member 61 and second heat conduction member 62 can reliably be brought into contact with end portions of first cell group 11 and second cell group 12 located on the middle plate 13 side.

In addition, since first cell group 11 and second cell group 12 can be pressed against bottom wall portion 22 more firmly by using pressing member 80, the adhesiveness of power storage stack 10 can be further improved.

It should be noted that, although the above description illustrates the case where pressing member 80 is fixed to reinforcing brackets 212, the present disclosure is not limited thereto, and pressing member 80 may be fixed to bottom wall portion 22. Further, when power storage stack 10 can be sufficiently fixed to bottom wall portion 22 by heat conduction member 60, pressing member 80 and reinforcing brackets 212 may be omitted.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. A power storage device comprising: a power storage stack that includes a first cell group and a second cell group each including a plurality of power storage cells, and a middle plate disposed between the first cell group and the second cell group; a lower case that has a bottom wall portion and on which the power storage stack is disposed, the bottom wall portion having an inner main surface facing toward the power storage stack and an outer main surface facing opposite to a side on which the power storage stack is located; a first heat conduction member disposed between the first cell group and the bottom wall portion; a second heat conduction member disposed between the second cell group and the bottom wall portion; and a cooler configured to transfer heat away from the power storage stack, the cooler disposed outside the lower case to thermally couple with the outer main surface; wherein the lower case includes a pedestal portion that is provided to rise from the bottom wall portion and supports the middle plate, the first heat conduction member and the second heat conduction member being provided to contact the pedestal portion, wherein the first heat conduction member abuts the first cell group and the bottom wall portion.

2. The power storage device according to claim 1, wherein the middle plate has a first protruding portion protruding from the pedestal portion toward the first cell group, and a second protruding portion protruding from the pedestal portion toward the second cell group, in an arrangement direction in which the first cell group and the second cell group are arranged, and when seen from a direction perpendicular to the arrangement direction, the first heat conduction member is provided to fill a gap between the first protruding portion and the pedestal portion, and the second heat conduction member is provided to fill a gap between the second protruding portion and the pedestal portion.

3. The power storage device according to claim 1, wherein the pedestal portion includes a first pedestal portion and a second pedestal portion disposed to be spaced from each other in a direction perpendicular to an arrangement direction in which the first cell group and the second cell group are arranged.

4. The power storage device according to claim 1, further comprising a pressing member that presses the power storage stack toward the bottom wall portion, wherein the power storage stack has one end and another end in an arrangement direction in which the first cell group and the second cell group are arranged, and the pressing member has a first pressing portion for pressing the one end toward the bottom wall portion, and a second pressing portion for pressing the other end toward the bottom wall portion.

5. The power storage device according to claim 2, wherein the pedestal portion includes a first pedestal portion and a second pedestal portion disposed to be spaced from each other in a direction perpendicular to an arrangement direction in which the first cell group and the second cell group are arranged.

6. The power storage device according to claim 2, further comprising a pressing member that presses the power storage stack toward the bottom wall portion, wherein the power storage stack has one end and another end in an arrangement direction in which the first cell group and the second cell group are arranged, and the pressing member has a first pressing portion for pressing the one end toward the bottom wall portion, and a second pressing portion for pressing the other end toward the bottom wall portion.

7. The power storage device according to claim 3, further comprising a pressing member that presses the power storage stack toward the bottom wall portion, wherein the power storage stack has one end and another end in an arrangement direction in which the first cell group and the second cell group are arranged, and the pressing member has a first pressing portion for pressing the one end toward the bottom wall portion, and a second pressing portion for pressing the other end toward the bottom wall portion.

8. The power storage device according to claim 5, further comprising a pressing member that presses the power storage stack toward the bottom wall portion, wherein the power storage stack has one end and another end in an arrangement direction in which the first cell group and the second cell group are arranged, and the pressing member has a first pressing portion for pressing the one end toward the bottom wall portion, and a second pressing portion for pressing the other end toward the bottom wall portion.

9. The power storage device according to claim 1, wherein the cooler includes a refrigerant flow path.

10. The power storage device according to claim 1, further comprising an outer heat conduction layer disposed between the cooler and the outer main surface of the bottom wall portion of the lower case.

11. The power storage device according to claim 1, wherein the pedestal portion extends upward from the bottom wall portion.

12. The power storage device according to claim 1, wherein the second heat conduction member abuts the second cell group and the bottom wall portion.

13. The power storage device according to claim 1, wherein the first heat conduction member fixes the first cell group to the bottom wall portion.

14. The power storage device according to claim 12, wherein the first heat conduction member fixes the first cell group to the bottom wall portion and the second heat conduction member fixes the second cell group to the bottom wall portion.

15. The power storage device according to claim 10, wherein the outer heat conduction layer abuts the cooler and the outer main surface of the bottom wall portion of the lower case.

* * * * *